United States Patent

Zhung et al.

[19]

[11] Patent Number: 5,875,007
[45] Date of Patent: Feb. 23, 1999

[54] MOTION IMAGE (MPEG II) VIDEO STREAM MULTIPLEXING SYSTEM

[75] Inventors: Chul Hyung Zhung; Hyo Joong Kim; Sung Soo Kang, all of Daejeon, Rep. of Korea

[73] Assignees: Electronics and Telecommunications Research Institute, Daejeon; Korea Telecommunication, Seoul, both of Rep. of Korea

[21] Appl. No.: 758,152

[22] Filed: Nov. 25, 1996

[30] Foreign Application Priority Data

Dec. 22, 1995 [KR] Rep. of Korea .................. 1995-54001

[51] Int. Cl.[6] ............................... H04N 7/22; H04N 7/52
[52] U.S. Cl. ...................... 348/845.2; 348/423; 348/473
[58] Field of Search ................................ 348/845.2, 423, 348/473; H04N 7/27, 7/52

[56] References Cited

U.S. PATENT DOCUMENTS 3,773,979 11/1973 Kirk ........................................ 348/473
4,967,272 10/1990 Kao ........................................ 348/386
5,255,100 10/1993 Urbanus .................................. 348/441
5,583,562 12/1996 Birch ...................................... 348/423

*Primary Examiner*—Howard Britton
*Attorney, Agent, or Firm*—Antonelli, Terry, Stout & Kraus, LLP

[57] ABSTRACT

A motion image( MPEG II) video stream transmission system for transferring MPEG II video stream to a subscriber by receiving 6 channels of a motion image(MPEG II) video stream, and includes: a MPEG II encoder for encoding an analog video signal on a motion image video signal; a framer for framing and outputting a MPEG II video stream by controlling a read clock of pure data of the MPEG II video stream whenever data is variable, registering a transmission velocity information to a video stream inputted in the MPEG II encoder; a first multiplexing means; a second-stage multiplexer; a headend having an optical transmission means; an optical transmission system; a first-stage demultiplexing means; a second-stage demultiplexing means; a remote terminal having a video switching system; and a subscriber terminal apparatus for converting the MPEG II video signal into an analog signal after reframing a video signal outputted from the remote terminal and outputting the converted signal.

6 Claims, 6 Drawing Sheets

MOTION IMAGE (MPEG II) VIDEO STREAM MULTIPLEXING SYSTEM

BACKGROUND OF THE INVENTION

The present invention generally relates to a motion image( MPEG II) video stream transmission system.

An analog NTSC video signal is encoded on a digital video signal, which may comprise a plurality of the high speed encoding digital video signal. Also, it is not efficient to transmit directly a pure data encoding a video signal to a subscriber if the capacity of the transmission line is considered.

In particular, to such systems that provide MPEG II video stream transmission, the present invention facilitates high capacity video stream channels while transmitting from headend to a remote terminal adjacent to a subscriber.

SUMMARY OF THE INVENTION

Accordingly, it is an object of the present invention to provide a motion image video stream transmission system for multiplexing 6 channels of MPEG II video stream to DS3 by setting a remote terminal adjacent to a subscriber.

According to one aspect of the present invention, a motion image (MPEG II) video stream transmission system comprising: a MPEG II encoding means for encoding an analog video signal on a motion image video signal; a framing means for framing and outputting a MPEG II video stream by controlling a read clock of pure data of said MPEG II video stream whenever data is variable, registering a transmission velocity information to a video stream inputted in said MPEG II encoding means; a first multiplexing means for inserting and multiplexing primarily and outputting an order wire signal for order wire with a remote terminal of a switching center and a signal for a frame alignment word and a maintenance management for displaying a synchronization and starting point of a frame in the frame inputted from said framing means; a second multiplexing means for constructing DS3 frame by inserting an overhead in a signal inputted from said first multiplexing means and multiplexing secondarily the inserted signal; a headend having an optical transmission means for converting a DS3 signal inputted from said second multiplexing means into an optical signal and outputting the converted signal; an optical transmission means for converting an optical signal transmitted from said headend into an electrical signal; a first demultiplexing means for demultiplexing DS3 signal inputted from said optical transmission means and extracting the overhead from DS3 signal; a second demultiplexing means for demultiplexing a signal inputted from said first demultiplexing means secondarily and extracting the overhead; a remote terminal having a video switching means for switching and outputting a video signal outputted from said second demultiplexing means;and a subscriber terminal apparatus for converting said MPEG II video signal into an analog signal after reframing a video signal outputted from said remote terminal and outputting the converted signal.

If the process of the present invention is schematically examined, the present invention generates on 6.464 Mb/s (hereinafter, 6.5M) frame signal a MPEG II video stream. Three 6.5M signals are primarily multiplexed on 20.1312 Mb/s signal so that this signal can become a signal received in DS3 frame. Three 6.5M signals are received in 20.1312 Mb/s signal frame. Such a frame is composed of FAW (Frame Alignment Word) of 12 bit, a M&A channel related with a maintenance management, another overhead. As DS3 frame is constructed using two of 20.1312 Mb/s frame, six channels of MPEG II video stream are received in DS3 frame.

BRIEF DESCRIPTION OF THE ATTACHED DRAWINGS

The present invention will now be described with reference to the drawings attached only by way of example.

DETAILED DESCRIPTION OF PREFERRED EMBODIMENT

Hereinafter, one embodiment of the present invention will be explained in detail in reference to drawings attached.

Figure 1:
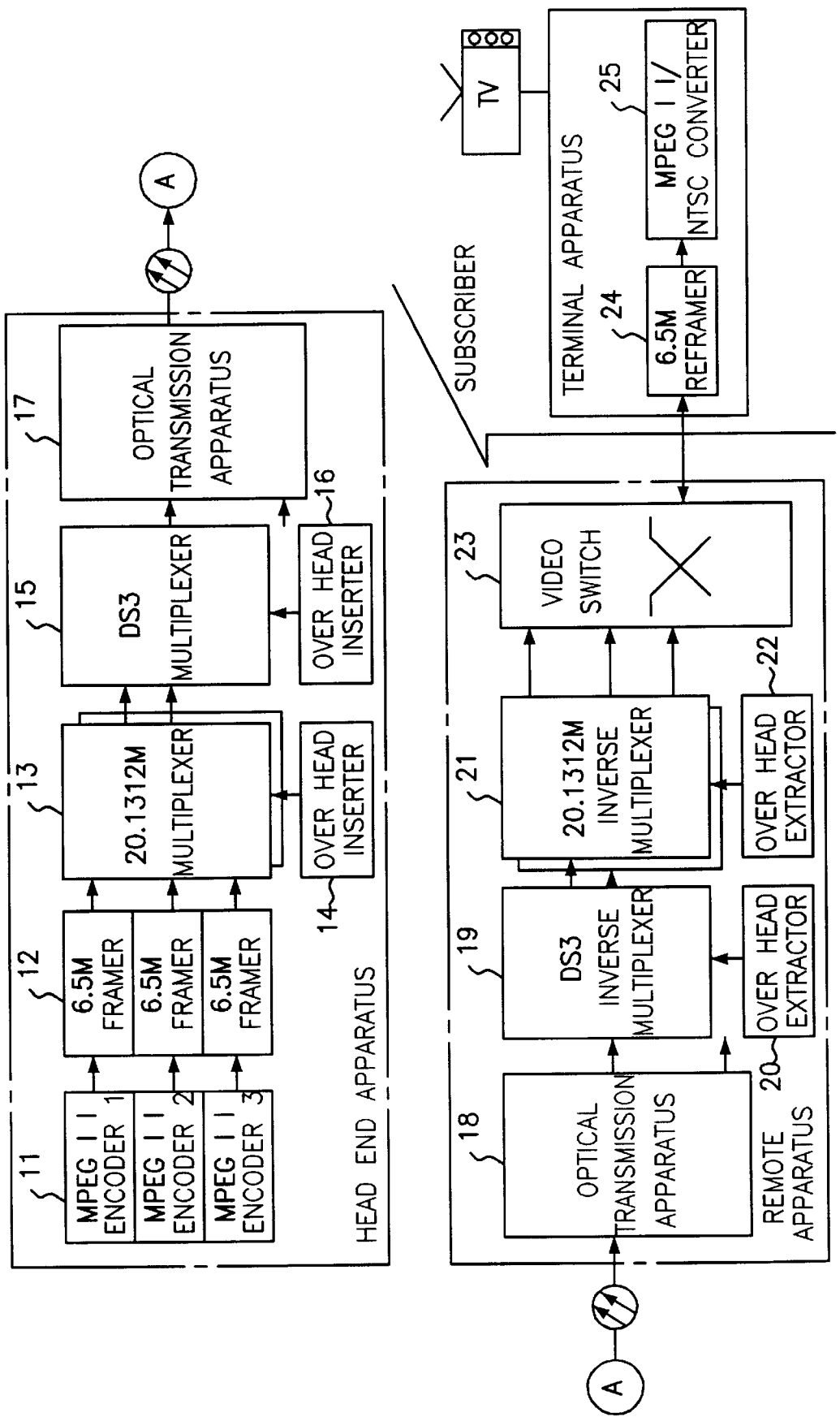
FIG. 1 is an overall construction view of a transmitting system for servicing MPEG II video stream according to the present invention to a subscriber.

FIG. 1 is an overall block diagram of a motion image video stream transmission system for transferring MPEG II video stream to a subscriber according to the present invention, composed of a headend, a remote terminal, a subscriber terminal apparatus.

A headend system comprises MPEG II encoders 11 for encoding analog-video signal on MPEG II, 6.5M framers 12 for generating frame for transmitting a video stream outputted from the MPEG II encoder 11 to a multiplexer, 20.1312M multiplexer 13 for multiplexing and outputting three 6.5M frames 12 outputted from the 6.5M framers 12, a first overhead inserter 14 for inserting the overhead of M&A and Order Wire etc. from the 20.1312M multiplexer 13 when multiplexing, DS3 multiplexer 15 for multiplexing two signals outputted from the 20.1312M multiplexer, a second overhead inserter 16 for inserting the overhead from the DS3 multiplexer 15 when multiplexing, and an optical transmitter 17 for converting DS3 signal outputted from the DS3 multiplexer 15 into an optical signal and transmitting the converted signal to a remote terminal.

A remote terminal comprises an optical transmitter 18 receiving the optical signal transmitted from a headend system and converting the received signal into DS3 signal, DS3 demultiplexer 19 demultiplexing MPEG II video stream from DS3 signal to 20.1312 Mb/s signal so as to extract MPEG II video stream of DS3 signals extracted from the optical transmitter 18, a first overhead extractor 20 for extracting an overhead included in DS3 signals when the DS3 signals are demultiplexed, a second overhead extractor 22 for extracting the overhead of M&A, Order Wire etc. transmitted from the headend in the 20.1312 Mb/s demultiplexer 21 when demultiplexing, and a video switch 23 for switching 6.5M signal to transmit the video signal which a subscriber wants about 6.5M frame signal outputted from the 20.1312 Mb/s inverse-multiplexer 21.

A subscriber terminal apparatus comprises 6.5M reframer 24 extracting MPEG II video stream receiving 6.5M signal transmitted from the video switch, and MPEG II/NTSC converter 1–14 converting MPEG II video stream into analog video signal. Among the respective apparatus of FIG. 1, the process converting into DS3 signal receiving 6 MPEG II video streams will be explained by using the following drawings.

Figure 2:
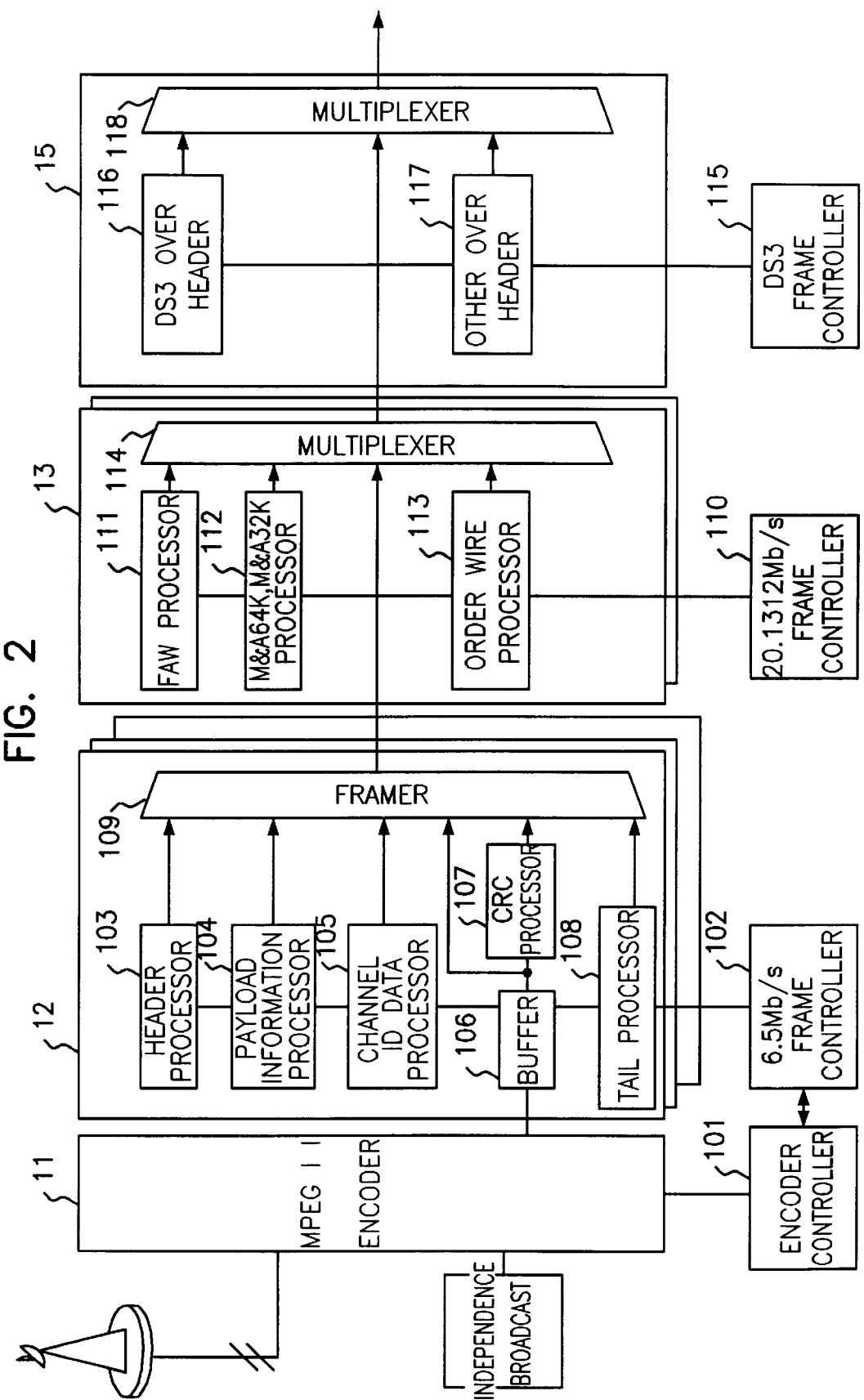
FIG. 2 is a block diagram of a headend according to the present invention.

FIG. 2 is a block diagram of a headend multiplexing MPEG II video stream according to the present invention.

There is an external analog video signal of a satellite receiver, a public antenna and an independence broadcast transferring by producing of it's own as MPEG II encoded signal.

These external analog video signals are encoded into MPEG II signal by means of MPEG II encoder 11 controlled by an encoder controller 101.

A 6.5M framer 12 can receive a pure MPEG II video stream from minimum 4.096 Mb/s data to maximum 6.114 Mb/s data, and cotrol a write/read clock of pure data of MPEG II video stream whenever data are variable registering a velocity information to video signal in a Payload Information Processor 104 consisted of 8 bits so as to be variable to data by 8 Kb/s.

Accordingly, MPEG II encoder 11 is stored in a buffer 106 by encoding in the velocity from 4.096 Mb/s data to 6.114 Mb/s under the encoder controller 101 controlling an encoding velocity to analog video signal.

In addition, 6.5 Mb/s frame controller 102 receives information related to this velocity from the encoder controller 101 and transmits data to a framer 109 and a CRC processor 107 reading in the same velocity video signals stored in the buffer 106.

In case that write/read encoded data is less than 6.114 Mb/s velocity data, data adding a Null data of a Padding signal with a payload signal are transmitted to a framer 109 and a CRC processor 107.

In addition, 6.5M framer 12 comprises a header processor 103 instructing a start and synchronization of a frame, a payload information processor 104 processing a data related with an encoded data velocity, a channel ID data processor 105 providing a channel ID to a video signal, a CRC processor 107 performing a CRC(cyclic redundancy check) so as to have a trust about an input encoding data, and a tail processor 108 indicating an end of a frame.

The respective channel IDs provided from the channel ID data processor 105 are to conform whether data switched from a video switch 23 of a remote terminal is a data which a subscriber wants or not using this ID from 6.5M reframer 24 equipped in a subscriber's home.

20.1312M multiplexer 13 performs a velocity compensation in a stuffing method of an asynchronous method of DS1(1.544 Mb/s)-DS2(6.312 Mb/s)-DS3(44.736 Mb/s) or DS1E(2.048 Mb/s)-DS2-DS3 in a conventional PDH series to receive 6.5M frame signal generated from 6.5M framer 12 into DS3 frame. However, in the construction of a DS3 signal frame of asynchronous series, the present invention is to be composed of a hardware related with frame generation and a controller according to data processing in simple synchronous clock in the mode of bit interleaving in a synchronous method. 20.1312M multiplexer 13 generates 20.1312 Mb/s signals receiving three 6.5M signals from the 6.5M framer 12.

2.1312M multiplexer 13 comprises a FAW processor 111 (Frame Alignment Word) for showing a synchronization and starting point of 20.1312 Mb/s frame, M&A 64K, M&A 32K processors 112 processing six M&A 64K having the velocity of 64 Kb/s and six M&A 32K having the velocity of 32 Kb/s to process signals related with M&A, an order wire signal processor 113 for order wire with a remote terminal of a switching center, and multiplexer 114 multiplexing the velocity of 20.1312 Mb/s using this signal.

Furthermore, there is 20.1312 Mb/s frame controller 110 for communicating and controlling an order wire with M&A.

A DS3 multiplexer 15 is a block diagram constructing DS3 frame multiplexing two 20.1312 Mb/s signals outputted from 20.1312 Mb/s multiplexer 114.

The DS3 multiplexer 15 comprises DS3 overheader 116 generating DS3 frame-overhead, other overheader 117 generating overhead except DS3-overhead, a multiplexer 118 multiplexing and outputting the 20.1312 Mb/s signal inputted in 20.1312 Mb/s multiplexer 114 and the output signals of the other overheader 117 and the DS3 overhead 116 in a bit interleaving method.

In addition, DS3 frame controller 115 controls DS3 overhead bit and other overhead, DS3 multiplexer 118 outputs the output signals of DS3 frame and 44.736 Mb/s velocity.

Figure 3:
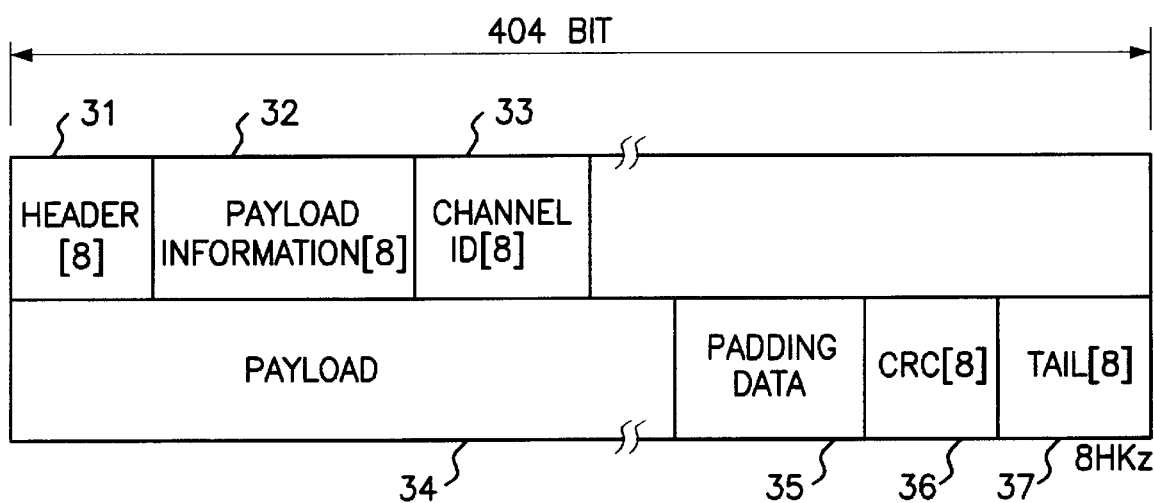
FIG. 3 is a construction view of 6.5M frame according to the present invention.

FIG. 3 is a frame construction view of 6.5M signal, is a frame receiving a payload signal 34 of MPEG II video stream in the range of from minimum 4.096 Mb/s data to maximum 6.114 Mb/s data composed of a 8 bit header 31, a 8 bit payload information 32 providing an information to a video signal so as to vary a velocity information to the payload signal in a unit of 8 Kb/s, a 8 bit CRC 36 of CRC test value to each video stream, and a 8 bit tail 37.

The payload 34 and padding signal 35 defines the number of bits by means of MPEG II video stream, in case that the video stream is minimum 4.096 Mb/s, the number of bit of payload are 512 bits, the number of bit of padding are Null of 256 bits, in case that maximum 6.114 Mb/s, the number of bit of payload are 768 bits, the number of padding bit is 0 bit.

Figure 4:
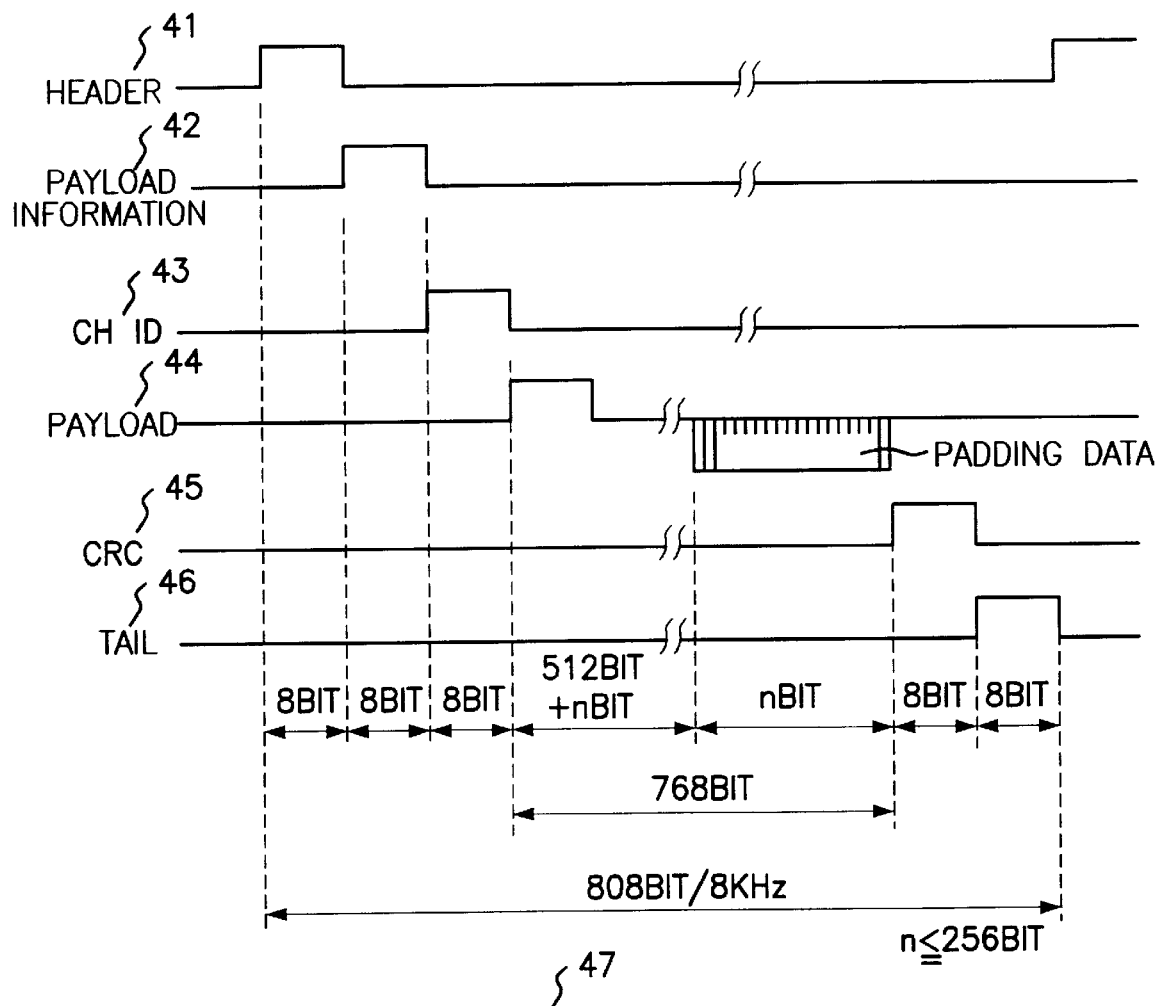
FIG. 4 is a timing graph for constructing 6.5M frame according to the present invention.

FIG. 4 is a signal timing graph for constructing a frame shown in FIG. 3. There can be generated in sequential a header 41, a payload information 42, a channel ID 43 by using a 8 bit counter.

A payload enable signal 44 receives a video stream in a payload using a clock counter of a video payload information processor 104 according to MPEG II video stream, the other data composes of 6.5M frame generating enable signal of a CRC 45 and a tail 46 after inserting Null data in fading signal.

The below (Table I) shows the detailed description of 6.5M frame.

TABLE I

| content | 6.464 Mb/s frame characteristic |
|---|---|
| frame velocity | 8 KHz |
| bit numbers per frame | 808 bit |
| payload + fading bit numbers | 708 bit |
| payload receiving video stream velocity | 4.096 Mb/s–6.114 Mb/s |
| video stream variable velocity displacement | 8 Kb/S |

6.5M frame velocity is 8 KHz per each frame, the total bit numbers per one frame are 808 bits, composed of two rows, each row being consisted of 404 bits.

A payload signal received in one frame is in the range of minimum 4.096 Mb/s signal to maximum 6.114 Mb/s signal. The variable velocity of the payload is in a unit of 8 Kb/s.

Figure 5:
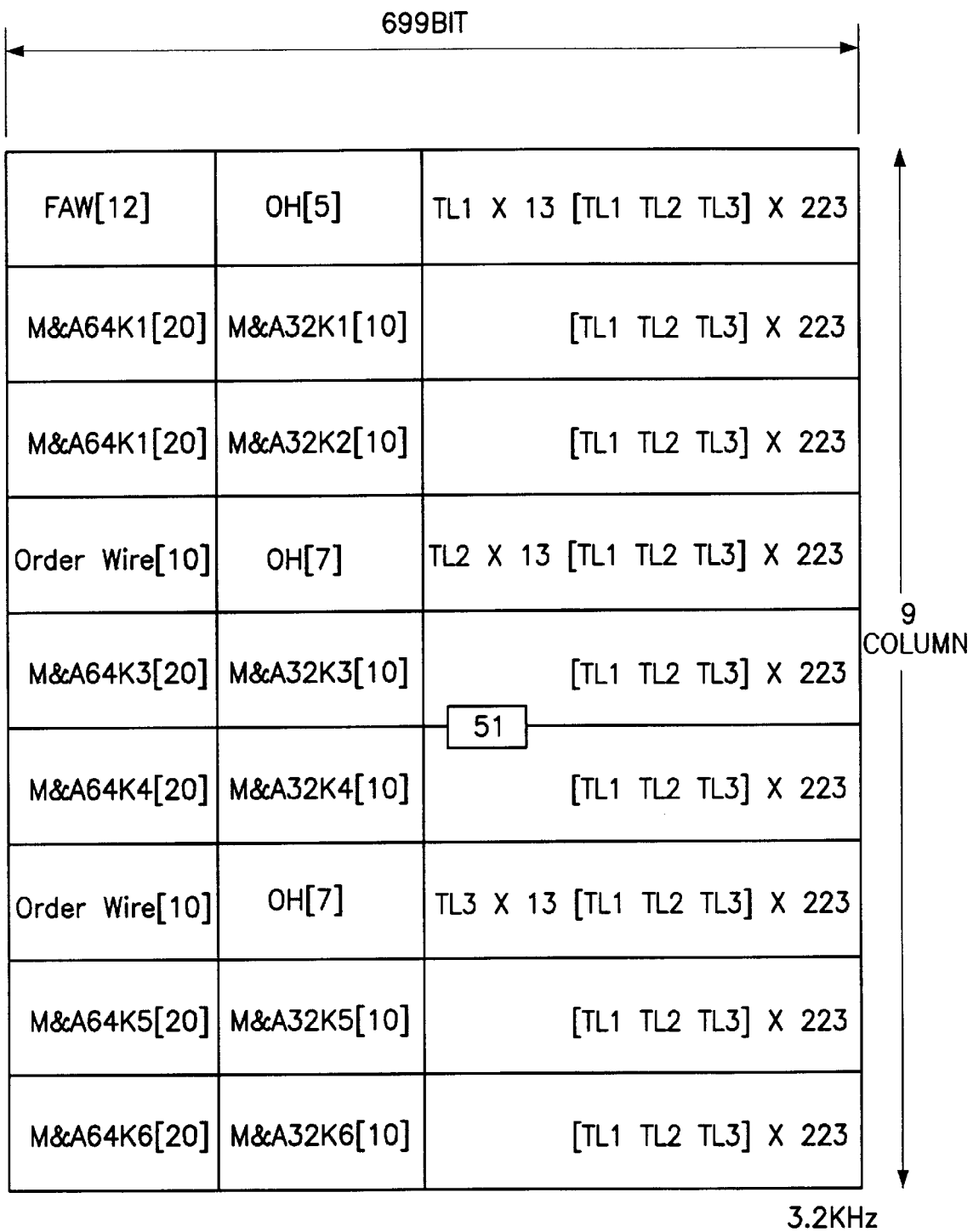
FIG. 5 is a construction view of 20.1312 Mb/s frame according to the present invention.

FIG. 5 is a frame construction view of 20.1312 Mb/s signal, is a frame receiving 3 channels of 6.5M tributary signal n for low speed data 6.464 Mb/s:TLN, which is composed of FAW of 12 bits, 64 Kb/s M&A of 6 channels, 32 Kb/s M&A of 6 channels, order wire 1 channel for using 64 Kb/s order wire and other overhead bit.

51 is a payload portion of 20.1312 Mb/s frame, comprises three 6.5M signals.

The format multiplexing the signal of TL1 to TL3 is as follows.

In a first row, the bit of TL1 to TL3 is repeated 223 times after 13 bits of TL1 data in 682 payload bits, In the next 2–3 row, the bit of TL1 to TL3 is repeated 223 times, in the next 4th row, the bit of TL1 to TL3 is repeated as described above after the 13 bits of TL2 data, in the next 4–5 row, the bit of TL1 to TL3 is repeated 223 times. In a 7th row, the bit of TL1 to TL3 is repeated 223 times as described above after the 13 bits of TL3 data, in the next 8–9 row, as above, the bit of TL1 to TL3 is repeated 223 times, as a result, to construct 20.1312 Mb/s frame.

The below (Table 2) shows the detailed description of 20.1312 Mb/s frame.

TABLE 2

| content | 20.1312 Mb/s frame chracteristic |
|---|---|
| frame velocity | 3.2 KHz |
| bit numbers per frame | 6291 bit |
| bit numbers per TLn(6.464 Mb/s) signal | 2020 bit |
| 6.464 Mb/s signal receiving numbers | 3 |
| M & A channel numbers | 64 Kb/s × 6, 32 Kb/s × 6 |
| Order Wire Channel numbers | 64 Kb/s × 1 |

20.1312 Mb/s signal velocity is 3.2 KHz per each frame, the number of bits per one frame are 6291 bits, composed of 9 rows, each row is consisted of 699 bits. The tributary signal received per one frame receives three signals of TL1–TL3, the number of bits per 6.5M signal are 2020 bits. There are used 6 channels of 64 Kb/s and 6 channels of 32 Kb/s as M&A channel, one channel of 64 Kb/s is received as channel for using order wire.

Figure 6:
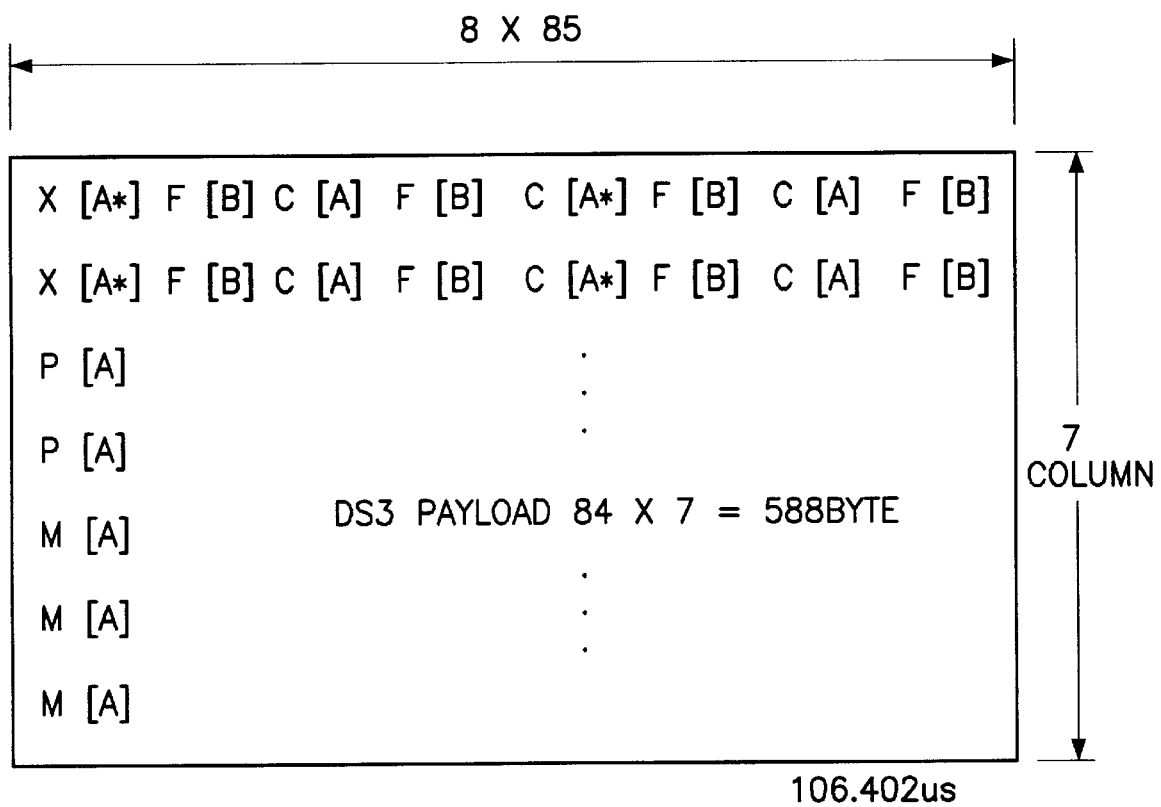
FIG. 6 is a construction view of DS3 frame according to the present invention.

FIG. 6 shows DS3 frame construction according to the present invention.

For using the basic construction of DS3 frame, which is composed of 420 bits except DS3 overhead bits as frame receiving 2 channels of 20.1312 Mb/s(THn: Tributary Signal n for High Speed Data 20.1312 Mb/s) in a payload bit except DS3 overhead bit (X,P,M,F,C overhead bit).

Wherein, DS3 overhead bits (X,P,M,F,C) are bits prescribed in ITU-T G.752. 61 indicates the enumeration of bits including 20.1312 Mb/s data.

A* bits are enumerated after DS3 overhead and are the enumeration of bits, repeating the bits of TH1–TH2 of 31 times after receiving reserved overhead 22 bits. A bits are enumerated after DS3 overhead bit and are the enumeration of bits repeating the bits of TH1–TH2 of 38 times after reserved overhead 8 bits. B bits receive reserved overhead 6 bits after DS3 overhead bit and are the enumeration of bits repeating the bits of TH1 to TH2 of 39 times.

The below (Table 3) shows the characteristic of DS3 frame.

TABLE 3

| content | DS3 frame chracteristic |
|---|---|
| frame velocity | 44.736 Mb/s |
| bit numbers per THn(20.1312 Mb/s) signal | 2142 bit |
| overhead bit numbers except DS3 overhead bit (X, F, C, P, M) | 420 bit |
| 20.1312 Mb/s signal receiving numbers | 2 |

DS3 frame velocity and bit numbers per one frame are 106.402 us velocity, 4760 bits respectively because of using a conventional DS3 frame.

The tributary signal in DS3 frame payload receives 2 channels of 20.1312 Mb/s signal, the number of bit per each tributary signal is 2142, the reserved bit numbers except DS3 overhead bit are 420 bits, as a result, to construct DS3 frame.

Accordingly, the present invention as constructed above can transmit on DS3 signal from a headend to a remote terminal by receiving 6 video streams of maximum 6.144 Mb/s MPEG II, has a simple hardware and control function effect by multiplexing the construction of DS3 frame in a simple bit interleaving method.

Although the present invention has been described above with reference to the preferred embodiments thereof, those skilled in the art will readily appreciate that various modifications and substitutions can be made thereto without departing from the spirit and scope of the invention as set forth in the appended claims.

What is claimed is:

1. A motion image (MPEG II) video stream transmission system comprising:

a MPEG II encoding means for encoding an analog video signal on a motion image video signal;

a framing means for framing and outputting a MPEG II video stream by controlling a read clock of pure data of said MPEG II video stream whenever data is variable, registering a transmission velocity information to a video stream inputted in said MPEG II encoding means;

a first-stage multiplexing means for inserting and multiplexing primarily and outputting an order wire signal for order wire with a remote terminal of a switching center and a signal for a frame alignment word and a maintenance management for displaying a synchronization and starting point of a frame in the frame inputted from said framing means;

a second-stage multiplexing means constructing DS3 frame by inserting an overhead in a signal inputted from said first-stage multiplexing means and multiplexing secondarily the inserted signal;

a headend having an optical transmission means for converting a DS3 signal inputted from said second-stage multiplexing means into an optical signal and outputting the converted signal;

an optical transmission means for converting an optical signal transmitted from said headend into an electrical signal;

a first-stage demultiplexing means for demultiplexing DS3 signal inputted from said optical transmission means and extracting the overhead from DS3 signal;

a second-stage demultiplexing means for demultiplexing a signal inputted from said first-stage demultiplexing means secondarily and extracting the overhead;

a remote terminal having a video switching means for switching and outputting a video signal outputted from said second-stage demultiplexing means; and a subscriber terminal apparatus for converting said MPEG II video signal into an analog signal after reframing a video signal outputted from said remote terminal and outputting the converted signal.

2. The motion image (MPEG II) video stream transmission system according to claim 1, wherein said framing means comprises:

a framing controlling means for controlling a transmitting velocity and timing to frame a MPEG II video stream;

a buffering means for storing a signal inputted for a while by being encoded on the signal velocity of 4.096 Mb/s to 6.114 Mb/s from said MPEG II encoding means and outputting the stored signal by a write signal of said frame control means;

a channel ID data processing means providing a channel identifier (ID) to a video signal under the control of said frame control means;

a payload information processing means for storing a transmitting velocity of an encoded data under the control of said frame control means and a payload information related thereto and processing them;

a header processing means for processing an information instructing a start and synchronization of a frame under the control of said frame control means;

a CRC(Cyclic Redundancy Check) processing means for performing a CRC test to said MPEG II video stream outputted from said buffering means;

a tail processing means for outputting a tail showing an end of the frame under the control of said frame control means;and a 6.5M framing means for framing and outputting data outputted from said tail processing means and said CRC processing means, said header processing means, said payload information processing means, said channel ID data processing means, said bufferring means under the control of said framing control means.

3. The motion image (MPEG II) video stream transmission system according to claim 1, wherein said first-stage multiplexing means comprising:

a frame control means for outputting a control signal for multiplexing primarily 6.5 frame inputted from said framing means;

a frame alignment word(FAW) processing means for processing a frame alignment word for displaying a synchronization and starting point of the frame on a frame inputted from said framing means under the control of said frame control means;

a maintenance management signal processing means for processing data for maintenance management under the control of said frame control means;

an order wire processing means for processing an order wire signal for order wire with a remote terminal of a switching center under the control of said frame control means;and a multiplexing means for receiving and multiplexing on 20.1312 Mb/s and outputting three 6.5M b/s signals outputted from said framing means and signals outputted from said order wire processing means, said maintenance management signal processing means, said frame alignment word processing means under the control of said frame control means.

4. The motion image (MPEG II) video stream transmission system according to claim 3, wherein said maintenance management signal processing means processes signals related with the maintenance management of six M&A 64 K having 64 Kb/s velocity and six M&A 32K having 32 Kb/s velocity.

5. The motion image (MPEG II) video stream transmission system according to claim 1, wherein said second multiplexing means comprises:

a frame control means controlling a signal outputted from said first-stage multiplexing means for multiplexing on DS3 signal a signal outputted from said first-stage multiplexing means;

a DS3 overhead processing means for generating a self-overhead of DS3 signal under the control of said frame control means;

an other overhead processing means for generating another overhead except the DS3 overhead under the control of said frame control means;and a multiplexing means for multiplexing and outputting the inputted signals in the mode of bit interleaving by receiving signals outputted from said DS3 overhead processing means and other overhead processing means and 20.1312 Mb/s signal outputted from said first-stage multiplexing means.

6. The motion image (MPEG II) video stream transmission system according to claim 5, wherein said multiplexing means provides a DS3 frame and 44.736 Mb/s velocity signal.

* * * * *